United States Patent [19]
Struthers et al.

[11] 3,802,255
[45] Apr. 9, 1974

[54] FIXTURE FOR TENSILE AND STRESS RUPTURE TESTING OF TURBINE BLADES

[75] Inventors: John O. Struthers; John A. Miller, both of Lake Park; Raymond R. Boucher, Tequesta, all of Fla.

[73] Assignee: The United States of America as represented by the Scretary of the Air Force, Washington, D.C.

[22] Filed: Mar. 8, 1972

[21] Appl. No.: 232,835

[52] U.S. Cl. .............................................. 73/103
[51] Int. Cl. .............................................. G01n 3/08
[58] Field of Search .............................. 73/103, 95

[56] References Cited
UNITED STATES PATENTS

| | | | |
|---|---|---|---|
| 3,358,498 | 12/1967 | Wright | 73/103 |
| 3,690,160 | 9/1972 | Kriesten | 73/103 X |
| 3,603,143 | 9/1971 | Detert | 73/100 X |

Primary Examiner—Jerry W. Myracle

[57] ABSTRACT

A fixture to hold turbine blades, too small for conventional test-bar testing methods, which grasps the root and tip end of the blade. The fixture is formed of a suitable metal alloy and is molded to fit the blade tip and root, and is adapted to be secured to the testing machine.

2 Claims, 4 Drawing Figures

PATENTED APR 9 1974  3,802,255

FIXTURE FOR TENSILE AND STRESS RUPTURE TESTING OF TURBINE BLADES

BACKGROUND OF THE INVENTION

This invention relates generally to mechanical testing and more specifically to a means for securing small turbine blades in a mechanical testing apparatus.

During the mechanical properties test sequence of the airfoil of a turbine or compressor blade for a jet engine, it is of the utmost importance that the blade be adequately supported and prevented from any bending or twisting. Conventionally this is done by machining a test bar from the blade and using this specially prepared specimen for test purposes. However, besides the advantage gained from testing the actual part, some blades are of insufficient size to prepare a test specimen. Until now there has been no reliable means for holding the small blades in the testing device.

Such small blades are found in small jet engines and rocket engine turbines.

In the course of the testing procedure the blade is secured at both the root and tip and an axial load applied. Prior to applying a load, however, the test blade is heated, and brought to test temperature and subsequently the airfoil test is commenced. The device described hereinafter provides a new and novel means for holding turbine blades in the testing machines.

SUMMARY OF THE INVENTION

The invention uses a pair of molded fixture pieces that are cast to fit the contour of the critical faces of the blade. The fixture is made from IN100 alloy that has characteristics of strength and heat resistance. After the fixture has been cast to fit the blade the two halves are machined and drilled to accept pins to secure the two halves together. The end of the fixture is drilled and threaded and otherwise adapted to fit into the testing machine.

It is therefore an object of the invention to provide a new and improved fixture for tensile and stress rupture testing of turbine blades.

It is another object of the invention to provide a new and improved fixture for tensile and stress rupture of turbine blades that can be easily fabricated from castable, high temperature alloys.

It is a further object of the invention to provide a new and improved fixture for applying an axial load to the tip and root of a turbine blade.

It is still another object of the invention to provide a testing fixture for small turbine blades.

It is still a further object of the invention to provide a testing fixture that is strong, reliable, economical to produce and utilizes conventional, currently available materials.

These and other advantages, features and objects of the invention will become more apparent from the following description taken in connection with the illustrative embodiment in the accompanying drawing.

DETAILED DESCRIPTION OF THE PREFERRED EMBODIMENT

Figure 1:
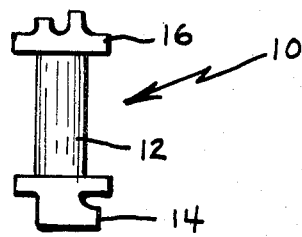
FIG. 1 is a side elevation view of a typical turbine blade.

Referring now to FIG. 1 there is shown a typical miniature turbine blade 10 having a blade portion 12 and attached thereto a root 14 for engagement with the turbine shaft. The tip 16 is adapted to engage a retaining ring for securing the blades against centrifugal force.

Figure 2:
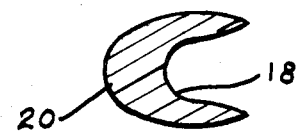
FIG. 2 is a cross sectional view of the turbine blade.

FIG. 2 is a cross section of the turbine blade 12 and shows the concave, bucket like portion of the blade 18 with a corresponding convex shap 20.

Figure 3:
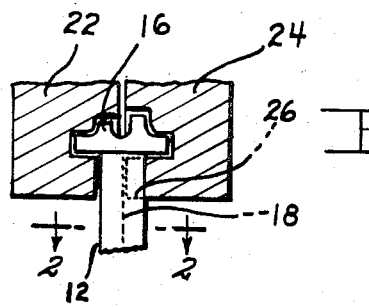
FIG. 3 is a side elevation view of the turbine blade in the fixture.

In FIG. 3 a pair of molded blocks 22 and 24 fit the shape of the blade 12 and tip 16. The block 24 precisely fits the concave shape of the blade 18 at 26.

Figure 4:
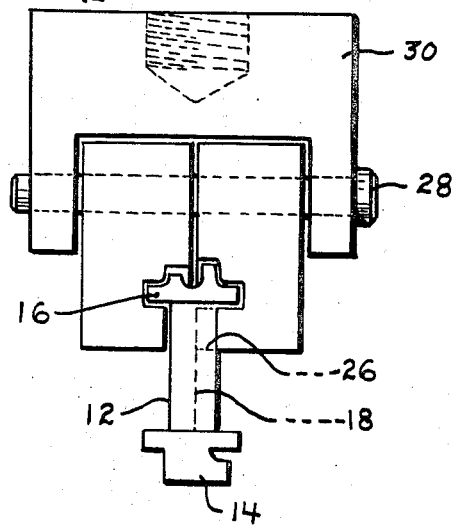
FIG. 4 is a side elevation view of a turbine blade in the fixture.

Concerning FIG. 4, the turbine blade 12 with root 14 and tip 16 is held in the fixture consisting of two members 22 and 24. The two halves of the fixture are held together by a pin 28 that also secures the fixture to the adapter 30. The adapter is threaded at 32 to fit into an appropriate testing machine.

The fixture consists of two IN100 alloy blocks molded to provide a strong, precision fit for the testing apparatus. In molding the fixture, a novel method to be described herein is utilized. A portion of the turbine blade is placed in a suitable plaster cast whereby a seal and parting line is provided for the low melting point metal mold. After the plaster is allowed to set, the exposed area of the blade is lubricated with mold release compound. A low melting point metal is then poured over the exposed surface of the blade and plaster cast held in a supporting container. After these steps have been accomplished the low melting point metal mold is separated from the plaster and the blade. These steps are repeated for the opposite side of the blade thereby providing a complete mold of low melting point metal.

At this point the mold is first machined as necessary and then suspended in a suitably large container which is filled with a castable ceramic material. Once the ceramic material has set the low melting point metal is melted out and the ceramic mold is fired and cured. After the mold is formed IN100 alloy is cast into the cavity left by the removal of the low melting point metal to form the fixture. When alloy has cooled the mold is removed and the remaining piece is cut, drilled and machined to fit the testing machine and provide a fixture set for both the root and tip of the blade.

It is to be understood that the invention is not limited to the embodiment herein described but may be used in other ways without departure from its spirit as defined by the following claims.

What is claimed is:

1. A fixture for tensile and stress rupture testing of turbine blades comprising turbine blade: a first block of suitable material having formed therein a chamber for receiving the turbine blade, said chamber so formed as to substantially encase one portion of said blade; a second block of suitable material having formed therein a chamber for receiving the turbine blade, said chamber so formed as to substantially encase the remaining portion of said blade, and each of said blocks having mating aperatures therethrough; at least one pin adapted to fit in said aperatures and secure the blocks in a mated condition.

2. A fixture according to claim 1 wherein, said suitable material includes IN100 steel.

* * * * *